United States Patent
Islam et al.

(10) Patent No.: US 7,254,337 B1
(45) Date of Patent: Aug. 7, 2007

(54) BAND OPTICAL ADD/DROP MULTIPLEXING

(75) Inventors: Mohammed N. Islam, Allen, TX (US); Andrzej Kaminski, Allen, TX (US); Herve A. Fevrier, Plano, TX (US); Carl A. DeWilde, Richardson, TX (US); Ozdal Boyraz, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 11/383,686

(22) Filed: May 16, 2006

(51) Int. Cl.
 *H04J 14/02* (2006.01)
(52) U.S. Cl. .................................................. 398/83
(58) Field of Classification Search ........... 398/43–103
 See application file for complete search history.

(56) References Cited

U.S. PATENT DOCUMENTS

| | | | |
|---|---|---|---|
| 4,700,339 A | 10/1987 | Gordon et al. ................. 370/3 |
| 4,932,739 A | 6/1990 | Islam ....................... 350/96.15 |
| 4,995,690 A | 2/1991 | Islam ....................... 350/96.15 |
| 5,020,050 A | 5/1991 | Islam ............................ 370/4 |
| 5,078,464 A | 1/1992 | Islam .......................... 385/122 |
| 5,101,456 A | 3/1992 | Islam ........................... 385/27 |
| 5,115,488 A | 5/1992 | Islam et al. ................. 385/129 |
| 5,224,194 A | 6/1993 | Islam .......................... 385/122 |
| 5,369,519 A | 11/1994 | Islam ......................... 359/173 |
| 5,485,536 A | 1/1996 | Islam .......................... 385/31 |
| 5,600,473 A | 2/1997 | Huber ........................ 359/179 |
| 5,664,036 A | 9/1997 | Islam .......................... 385/31 |
| 5,778,014 A | 7/1998 | Islam ........................... 372/6 |
| 5,796,909 A | 8/1998 | Islam .......................... 385/147 |
| 6,043,927 A | 3/2000 | Islam .......................... 359/332 |
| 6,052,393 A | 4/2000 | Islam ........................... 372/6 |
| 6,072,601 A | 6/2000 | Toyohara ................... 358/484 |
| 6,084,694 A | 7/2000 | Milton et al. ............... 359/124 |

(Continued)

FOREIGN PATENT DOCUMENTS

| EP | 1 009 120 A2 | 6/2000 |
|---|---|---|
| EP | 1 061 683 A1 | 12/2000 |

OTHER PUBLICATIONS

Yariv, "Optical Electyronics in Modern Communications," Detection of Optical Radiation, Ch. 11, pp. 412-473, n/a.
Rottwitt et al., "A 92 nm Bandwidth Raman Amplifier", paper PD-6, pp. 1-4, n/a.
Keslassy et al., "Maintaining Packet Order in Two-Stage Switches," Computer Systems Laboratory, Stanford University, 10 pages.
Optical Society of America, Optical Amplifiers and Their Applications, Technical Digest, entitled Raman amplification and dispersion-managed solitons for all-opti, Jul. 1-4, 2001.

(Continued)

*Primary Examiner*—Jason Chan
*Assistant Examiner*—David Lee
(74) *Attorney, Agent, or Firm*—Baker Botts L.L.P.

(57) ABSTRACT

An optical communication system includes a plurality of optical add/drop multiplexers (OADMs). The plurality of OADMs includes at least five low distortion OADMs. Each OADM is coupled between spans of a multiple span communication link and operable to receive a multiple wavelength signal. The multiple wavelength signal includes a plurality of bands of wavelength signals each separated from other bands of wavelength signals by one or more guard-channels. In one embodiment, each of the at least five low distortion OADMs adds/drops a common first band of wavelengths to/from the multiple wavelength signal. In some embodiments, a spectral distortion associated with a pass-through wavelength signal spectrally adjacent to one of the one or more guard-channels is no more than three decibels after exiting the last of the plurality of low distortion OADMs. In those embodiments, the guard-channel is adjacent to the first band of wavelengths.

20 Claims, 6 Drawing Sheets

U.S. PATENT DOCUMENTS

| | | | |
|---|---|---|---|
| 6,101,024 A | 8/2000 | Islam et al. | 359/334 |
| 6,229,937 B1 | 5/2001 | Nolan et al. | 385/24 |
| 6,239,902 B1 | 5/2001 | Islam et al. | 359/334 |
| 6,239,903 B1 | 5/2001 | Islam et al. | 359/337 |
| 6,297,895 B1 | 10/2001 | Okuno | 359/124 |
| 6,335,820 B1 | 1/2002 | Islam | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,493,119 B1 | 12/2002 | Kuo et al. | 359/128 |
| 6,571,031 B1 * | 5/2003 | Augustsson | 385/24 |
| 6,728,486 B1 * | 4/2004 | Hutchison et al. | 398/83 |
| 6,775,479 B2 | 8/2004 | Milton et al. | 398/79 |
| 6,788,899 B2 | 9/2004 | Way | 398/83 |
| 2003/0108351 A1 * | 6/2003 | Feinberg et al. | 398/34 |

OTHER PUBLICATIONS

Pending U.S. Appl. No. 10/100,591; entitled "System and Method for Managing System Margin," by Mohammed N. Islam et al., filed Mar. 15, 2002.

Pending U.S. Appl. No. 10/100,615, entitled "Band Optical Add/Drop Multiplexing" by Mohammed N. Islam et al., 73 pages, filed Mar. 15, 2002.

* cited by examiner

BAND OPTICAL ADD/DROP MULTIPLEXING

CROSS-REFERENCE TO RELATED APPLICATIONS

This application claims priority to U.S. application Ser. No. 10/100,615 filed Mar. 15, 2002, and entitled Band Optical Add/Drop Multiplexing.

TECHNICAL FIELD OF THE INVENTION

The present invention relates generally to communication systems, and more particularly to a system and method for optical communication using band optical add/drop multiplexers.

OVERVIEW

Optical add/drop multiplexers (OADMS) used in optical communication networks are capable of removing wavelength channels from multiple wavelength signals and adding channels to those signals. Conventional OADMs have typically been limited to use in a relatively few nodes within the network because of their inherent performance characteristics. In other words, as the number of conventional OADMs increases within the network, the limitations associated with conventional OADMs substantially affects network performance. These performance characteristics have limited the overall effectiveness and flexibility of the communications network.

SUMMARY OF EXAMPLE EMBODIMENTS

The present invention provides an improved system and apparatus for optical communication using band add/drop multiplexers. In accordance with the present invention, a system and method for adding/dropping bands of optical signals is provided that reduce or eliminate at least some of the shortcomings associated with prior approaches.

In one embodiment, an optical communication system comprises a plurality of optical add/drop multiplexers (OADMs). In this embodiment, the plurality of OADMs comprises at least five low distortion OADMs each coupled between spans of a multiple span communication link. Each low distortion OADM is operable to receive a multiple wavelength signal comprising a plurality of bands of wavelength signals each separated from other bands of wavelength signals by one or more guard-channels. In this embodiment, each of the at least five low distortion OADMs adds/drops a common first band of wavelengths to/from the multiple wavelength signal. In this embodiment, a spectral distortion associated with a pass-through wavelength signal spectrally adjacent to one of the one or more guard-channels that is adjacent to the first band of wavelengths comprises no more than three decibels after exiting the last of the plurality of low distortion OADMs.

In another embodiment, a multiple span optical communication system comprises at least one optical add/drop multiplexing (OADM) node. The at least one OADM node is operable to receive a plurality of input bands each comprising a different range of signal wavelengths and to communicate a plurality of output bands of signal wavelengths. In this embodiment, at least one of the output bands of signal wavelengths comprises a new wavelength range including at least some wavelengths from at least one of the input bands and at least one other wavelength signal not in the at least one input band.

In yet another embodiment, a multiple span optical communication system comprises at least one optical add/drop multiplexing (OADM) node. The at least one OADM node is operable to receive a plurality of input bands each comprising a different range of signal wavelengths and to communicate a plurality of output bands of signal wavelengths. In this embodiment, at least one of the output bands of signal wavelengths comprises a new wavelength range including some but not all of the wavelengths from at least one of the input bands.

In a method embodiment, a method of communicating optical signals using a band optical add/drop multiplexer, comprises receiving a multiple wavelength signal comprising a plurality of input bands of wavelength signals. Each of the plurality of input bands of wavelength signals comprises a different range of signal wavelengths. The method further comprises communicating a plurality of output bands of signal wavelengths. In this embodiment, at least one of the output bands of signal wavelengths comprises a new wavelength range including at least some wavelengths from at least one of the input bands and at least one other wavelength signal not in the at least one input band.

In another method embodiment, a method of communicating optical signals using a band optical add/drop multiplexer, comprises receiving a multiple wavelength signal. The multiple wavelength signal comprises a plurality of input bands of wavelength signals each comprising a different range of signal wavelengths. The method further comprises communicating a plurality of output bands of signal wavelengths. In this embodiment, at least one of the output bands of signal wavelengths comprises a new wavelength range including some but not all of the wavelengths from at least one of the input bands.

In still another method embodiment, a method of communicating optical signals using a band optical add/drop multiplexer (OADM) comprises receiving at a band OADM a multiple wavelength signal. The multiple wavelength signal comprises a plurality of input bands of wavelength signals each separated from the other input bands of wavelength signals by at least one guard-channel. The method further comprises dropping more than one of the plurality of input bands of wavelength signals at the band OADM. The method also comprises adding at least one band to a plurality of output bands of wavelength signals communicated from the band OADM.

Depending on the specific features implemented, particular embodiments of the present invention may exhibit some, none, or all of the following technical advantages. Various embodiments enable the use of band OADMs in some or all nodes of a multiple span communication link by substantially controlling spectral distortion associated with OADMs. Some embodiments may implement sacrificial guard-channels between bands of information bearing wavelength signals to protect the information bearing wavelength signals from asymmetry penalties associated with OADMs. Other embodiments may implement band OADMs capable of simultaneously dropping a plurality of bands of wavelengths to further reduce spectral distortion among the information carrying channels. Still other embodiments implement bandwidth redesignation, which allows the communication system to accommodate increased traffic between two nodes without requiring the designation of a relatively large bandwidth for communication between other nodes within the system. In addition, redesignation of bandwidth provides significant flexibility in operation, particularly in systems implementing large numbers of channels.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Conventional optical communication systems have generally sought to limit the number of nodes that perform optical add/drop multiplexing to avoid excessive loss in the optical signals. These systems may be limited, for example, to one or two OADMs per optical link. Conventional design wisdom focuses on insertion losses or contrast ratio as the primary impediments to implementing OADMs in multiple nodes along a communication link.

One aspect of this disclosure identifies spectral distortion, separate from insertion losses, as a major culprit in OADM losses. Some embodiments of this disclosure seek to control spectral distortion through the use of band OADMs and the use of one or more sacrificial guard-channels between bands of information bearing signals. By controlling the amount of spectral distortion, these embodiments facilitate utilizing numerous OADMs in a single optical link. Some embodiments can sufficiently control spectral distortion to allow use of band OADMs in some, most, or even all nodes of a multiple span communication link.

This disclosure recognizes that spectral distortion can arise, for example, from signal asymmetry induced by OADMS. As used in this document, the term "signal asymmetry" refers to a distorting effect experienced by side-band frequency components of pass-through wavelength signals when wavelengths adjacent to the pass-through wavelength signals are dropped.

Figure 1:
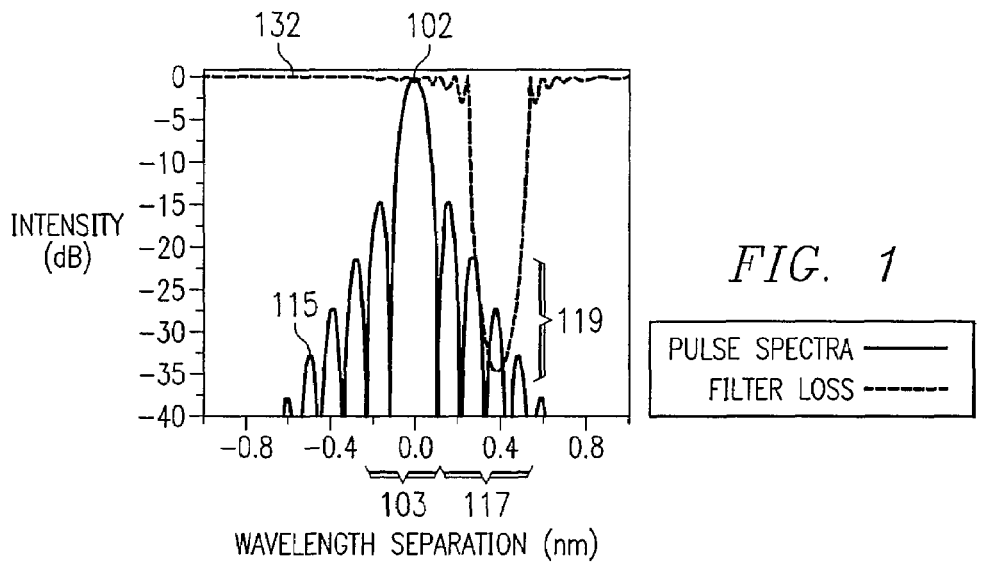
FIG. 1 is a graph showing an example of signal asymmetry in a wavelength signal adjacent to the wavelength signal being dropped.

FIG. 1 is a graph showing how even a filter function with a relatively steep side-band roll-off can create an asymmetry in a wavelength signal adjacent to the wavelength signal being dropped. In this example, line 115 illustrates a spectrum of a wavelength signal adjacent to the wavelength signal selected to be dropped. In this example, channel spacing is assumed to be 0.4 nanometers. Line 132 represents a filter function of an OADM configured to drop a wavelength signal adjacent to signal 115 shown in FIG. 1. As can be seen in this figure, filter function 132 will affect a portion 119 of the side-band 117 of signal 115 closest to the adjacent wavelength signal being dropped. In this case, portion 119 of side-band 117 is attenuated by filter function 132, which comprises asymmetric spectral distortion associated with OADMs. In addition, filter function 132 of the OADM will affect a portion 102 of the maximum amplitude 103 of signal 115.

Figure 2:
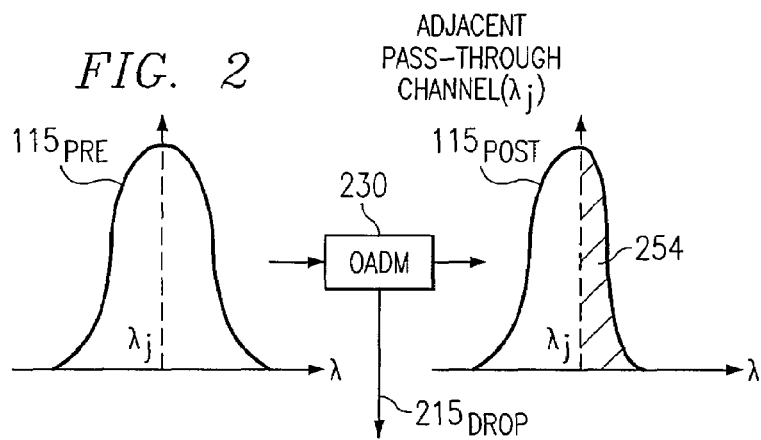
FIG. 2 is a graphic representation of a wavelength signal adjacent a dropped signal before and after passing through an OADM.

FIG. 2 is a graphic representation of adjacent signal 115 before and after passing through an OADM. In this example, line $115_{PRE}$ represents a wavelength signal adjacent to the wavelength signal or band of signals $215_{DROP}$ selected to be dropped by OADM 230. Line $115_{POST}$ represents the resulting adjacent signal after the wavelength signal or band of signals $215_{DROP}$ adjacent to signal 115 is dropped in OADM 230. In this example, signal $215_{DROP}$ comprises a longer wavelength signal than signal 115.

This figure shows a reduction in the energy of signal 115 after passing through OADM 230 as a result of the overlap between filter function 132 and the signal spectrum of signal 115. As shown here, because the dropped signal $215_{DROP}$ was adjacent to signal 115 and lower in frequency than signal 115, the higher frequency portion 254 of signal 115 is distorted due to interaction with filter function 132 acting on adjacent dropped wavelength signal $215_{DROP}$.

The spectral distortion of some of the frequency components of the pass-through signal spectrum adjacent to the dropped wavelength signals affects the intensity of the adjacent pass-through channels and leads to asymmetry in the adjacent channel. The spectral distortion attributable to asymmetry can be expressed mathematically as:

$$\text{Asymmetry} = \text{Energy}_{LOWER\ FREQUENCY} / \text{Energy}_{HIGHER\ FREQUENCY}$$

The spectral distortion attributable to asymmetry tends to increase with an increase in the number of channels used in the system. In general, the closer the channel spacing, the greater the affects of asymmetry on the adjacent pass-through channels.

Another aspect of this disclosure recognizes chromatic dispersion associated with OADMs as a source of spectral distortion. Chromatic dispersion can be introduced into pass-through wavelength signals adjacent to the signals or bands dropped by the OADM. In a system using a plurality of OADMs in an optical communications link, and in particular those systems using fixed wavelength OADMs, significant dispersion can accumulate in wavelength signals adjacent to those signals being dropped. Using band OADMs with sacrificial guard-channels between bands of information bearing channels decreases the aggregate chromatic dispersion introduced.

Figure 3:
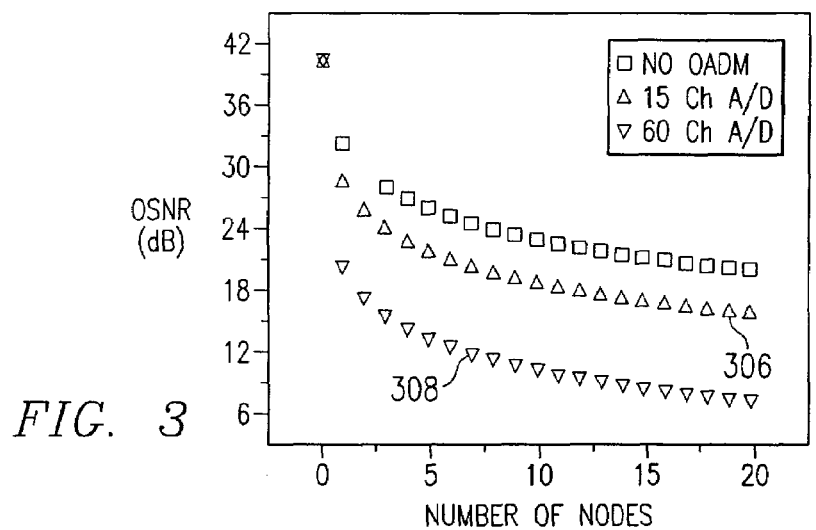
FIG. 3 is a graph showing how penalties associated with channel-by-channel OADMs can affect the optical signal-to-noise ratio of an optical communications system.

Still another source of spectral distortion can arise as a result of a decreased optical signal-to-noise ratio. FIG. 3 is a graph showing how spectral distortion associated with channel-by-channel OADMs can affect the optical signal-to-noise ratio of an optical communications system. This example assumes a twenty span optical communication link including, between each pair of spans, a node comprising a channel-by-channel OADM. The horizontal axis of FIG. 3 provides the maximum number of nodes that the system can support while maintaining a desired optical signal-to-noise ratio. In this example, lines 306 and 308 represent channel-by-channel OADMs supporting 15 and 60 channels, respectively.

As shown in this figure, a system that does not implement any optical add/drop multiplexers can maintain an optical signal-to-noise ratio of approximately 18 decibels over at least twenty spans. The same system supporting 15 channels and incorporating channel-by-channel OADMS, can only drop the same channel at 11 nodes while maintaining a signal-to-noise-ratio of 18 decibels. This metric gets worse as channel spacing decreases and the number of channels added and/or dropped increases. For example, the same system supporting 60 channels, can only drop the same channel at 2 nodes while maintaining a signal-to-noise-ratio of 18 decibels.

FIG. 3 shows that for a desired optical signal-to-noise ratio, the number of channel-by-channel OADMs is quite limited. This limitation occurs because each time an optical signal passes through a channel-by-channel OADM that drops an adjacent channel to the pass-through signal, the pass-through signal experiences asymmetry, loss, and chromatic dispersion penalties. These penalties adversely affect the intensity of the pass-through channels, requiring the use of optical amplifiers to at least partially compensate for those penalties. Optical amplifiers tend to introduce noise into the system, which degrades the optical signal-to-noise ratio of the system.

If the system included channel-by-channel OADMs in each node, therefore, the system would experience significant spectral distortion due to asymmetry and chromatic dispersion penalties, and would experience a poor optical signal-to-noise ratio as a result of the many optical amplifiers that would be needed to offset the asymmetry and chromatic dispersion penalties. The reach of the communication system would, therefore, be quite limited.

FIGS. 1-3 collectively show how implementing multiple channel-by-channel OADMs can result in asymmetry, chromatic dispersion, and loss of signal-to-noise ratio that significantly degrades the system performance. One aspect of at least some embodiments disclosed herein recognizes that reducing spectral distortion in pass-through wavelength signals can be as important as reducing insertion losses in those signals. Various embodiments described herein can achieve reduced spectral distortion in numerous ways.

For example, spectral distortion in adjacent signal wavelengths can be controlled by reducing the number of times that any one signal experiences an adjacent signal being added/dropped. This can be done, for example, by simultaneously adding/dropping a band of wavelength signals at each OADM. Throughout this disclosure the terms "add/drop," "adding/dropping," and "added/dropped" refer to either the operation of adding one or more wavelength signals, dropping one or more wavelength signals, or adding wavelength signals and dropping others. Those terms are not intended to require both add and drop operation, but are also not intended to exclude add and drop operations. The terms are merely used as a convenient way to refer to either adding or dropping or both adding and dropping operations.

As used throughout this disclosure, the term "band" refers to two or more wavelength signals residing spectrally adjacent to one another. By adding/dropping one or more bands of signal wavelengths at each OADM, only wavelength signals adjacent to the spectral edges of the band are affected by asymmetry penalties and chromatic dispersion. As used throughout this disclosure, the term "spectral edge" refers to the wavelength contained within a band of wavelengths that is immediately adjacent to a wavelength not included within that particular band of wavelengths. None of the wavelength signals within the added/dropped band experience this spectral distortion.

One aspect of this disclosure, therefore, seeks to reduce degradation due to spectral distortion by implementing, in multiple nodes in a communication link, band OADMs, each capable of simultaneously adding/dropping one or more bands of information carrying wavelengths at each node. In various embodiments, the communications link can comprise up to 5, 7, 10, 15, or more band OADMs.

Another way to reduce the number of times that any particular wavelength signal is adjacent to an added/dropped wavelength signal is to use one or more sacrificial guard-channels between the bands of information bearing wavelength signals. As used throughout this disclosure, the term "guard-channel" refers to one or more wavelength signals that reside between information bearing bands. While a wavelength is designated as a guard-channel, that wavelength is not relied on to carry information. Instead, while wavelength signals remain designated as guard-channels, they are considered sacrificial wavelengths. That is, guard-channels are used to protect information bearing wavelength signals residing in adjacent bands from spectral distortion while traversing the OADM.

Locating guard-channels between pass-through bands of channels and added/dropped bands of channels protects pass-through and added/dropped channels from asymmetry and chromatic dispersion penalties by allowing the guard-channels to absorb those penalties. None of the wavelength signals within the pass-through channels or the added/dropped channels will experience this spectral distortion.

In various embodiments implementing band OADMs in an optical communication system, at least one band OADM is capable of providing wide bandwidth service with a low spectral distortion. In some embodiments, at least five band OADMs are implemented in a multiple span communication system, each capable of adding/dropping the same band of wavelengths. This system results in a spectral distortion of no more than 3 dB after communication across the system. In other embodiments, at least twenty band OADMs are implemented in a multiple span communication system, resulting in a spectral distortion of no more than 3 dB in the adjacent pass-through channels after communication across the system.

In one particular embodiment, at least five band OADMs are implemented in a multiple span communication system, each capable of adding/dropping the same band of wavelengths. This system can result in a signal asymmetry of, for example, less than 3 decibels (dB) per channel. In some cases, this system results in an asymmetry of less than 2.5 decibels per channel, or even less than 2.0 decibels per channel. In another embodiment, a plurality of band OADMs are implemented in a multiple span communication system, resulting in an asymmetry penalty of less than 1.0 decibels in any of the adjacent pass-through channels after passing through each band OADM. In some cases, this system results in an asymmetry of less than 0.5 decibels, or even less than 0.3 decibels in any of the adjacent pass-through channels after passing through each band OADM.

Figure 4:
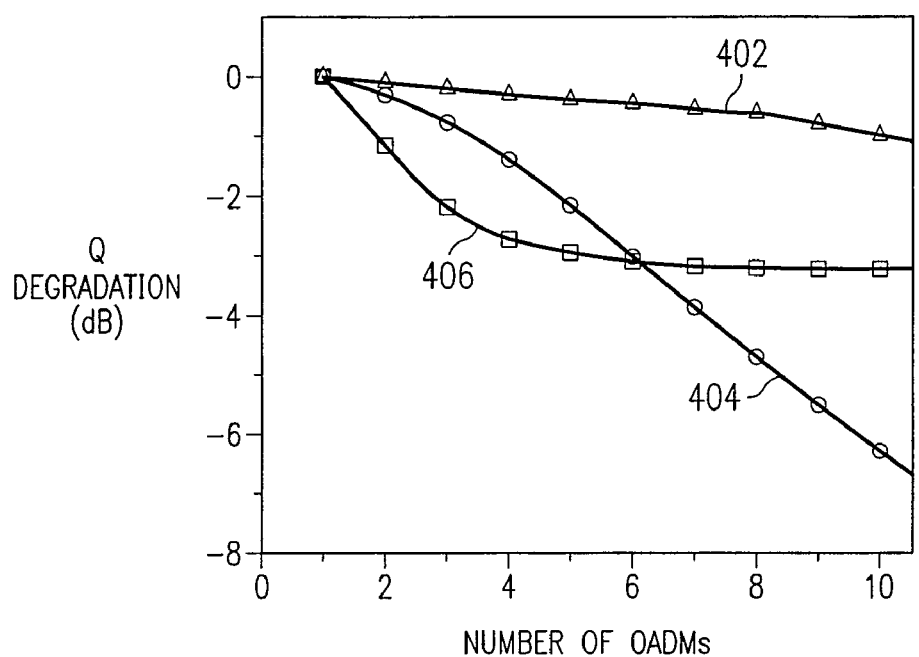
FIG. 4 is a graph showing how penalties associated with channel-by-channel and band OADMs can affect a Q-factor of an optical signal adjacent to the dropped channel or band of channels.

FIG. 4 is a graph showing how penalties associated with channel-by-channel and band OADMs can affect a Q-factor of an optical signal adjacent to the added/dropped channel or band of channels. This example assumes that a drop-channel or band of channels adjacent to a pass-through channel or band of channels are added/dropped at each of a plurality of nodes each comprising an OADM. The horizontal axis of FIG. 4 provides the number of nodes within the system that drop the drop-channel or band, while the vertical axis provides the degradation of the Q-factor of the pass-through channel or band after each node.

In this example, line 404 represents a Q-factor degradation of a pass-through channel in a channel-by-channel OADM. As shown in this figure, a system implementing a plurality of channel-by-channel OADMs with a channel spacing of approximately 0.4 nanometers, can only drop the same channel at two (2) nodes while maintaining Q-factor degradation of less than 1 dB. This metric degrades for channel-by-channel OADMs as channel spacing decreases.

This figure shows that to maintain the Q-factor degradation within acceptable parameters, the number of channel-by-channel OADMs is quite limited. This limitation occurs because each time an optical signal passes through a channel-by-channel OADM that drops a channel adjacent to the pass-through signal, the pass-through signal experiences spectral distortion. The penalties associated with spectral distortion adversely affect the intensity of the pass-through channels, which tends to degrade the Q-factor associated with the pass-through channel.

In this example, line 402 represents the Q-factor degradation of the pass-through band in a band OADM that implements at least one guard-channel between the pass-band and the drop-band. As shown in this figure, a system that implements at least ten band OADMs can maintain Q-factor degradation of the pass-through band to less than 3.0 decibels after communication across the system. In some embodiments, a system that implements at least twenty band OADMs can maintain Q-factor degradation of the pass-through band to less than 3.0 decibels after communication across the system. In some cases, this system results in a Q-factor degradation of less than 1.0 decibel, or even less than 0.8 decibels after communication across the system.

In one particular embodiment, at least five band OADMs are implemented in a multiple-span communication system, each capable of dropping the same band of wavelengths. In some cases, this system results in a Q-factor degradation of less than 3.0 decibels per channel, less than 1.0 decibel per channel, or even less than 0.5 decibels per channel.

FIG. 4 also shows how penalties associated with channel-by-channel OADMs can affect a Q-factor of an optical signal that is recirculated within a channel-by-channel OADM. As used in this document, the term "recirculated" refers to a wavelength signal that is dropped from a multiple wavelength signal at an OADM drop port and added back to the same multiple wavelength signal at the OADM add port without electrical-to-optical regeneration. In this example, line 406 represents a Q-factor degradation of a recirculated channel in a channel-by channel OADM. As shown in this figure, a system implementing a plurality of channel-by channel OADMs with a channel spacing of approximately 0.4 nanometers, can only recirculate the same channel once while maintaining the Q-factor degradation of 1.0 decibel or less.

This figure shows that to maintain Q-factor degradation at a minimum, the number of times a channel can be recirculated is quite limited. This limitation occurs because each time an optical signal is recirculated by an OADM, the recirculated signal experiences spectral distortion. The penalties associated with spectral distortion adversely affect the intensity of the recirculated signal, which tends to degrade the Q-factor associated with the recirculated signal.

This figure also shows that the magnitude of the affect of recirculation on Q-factor degradation decreases as the frequency of recirculation increases. This result occurs because the filter function of the OADM attenuates a portion of the side-band of the optical signal spectrum each time the signal is recirculated. As the frequency of recirculation increases, the side-band of the optical signal spectrum approximates the shape of the filter function, which has the effect of decreasing the magnitude of Q-factor degradation each time the signal is recirculated.

Figure 5:
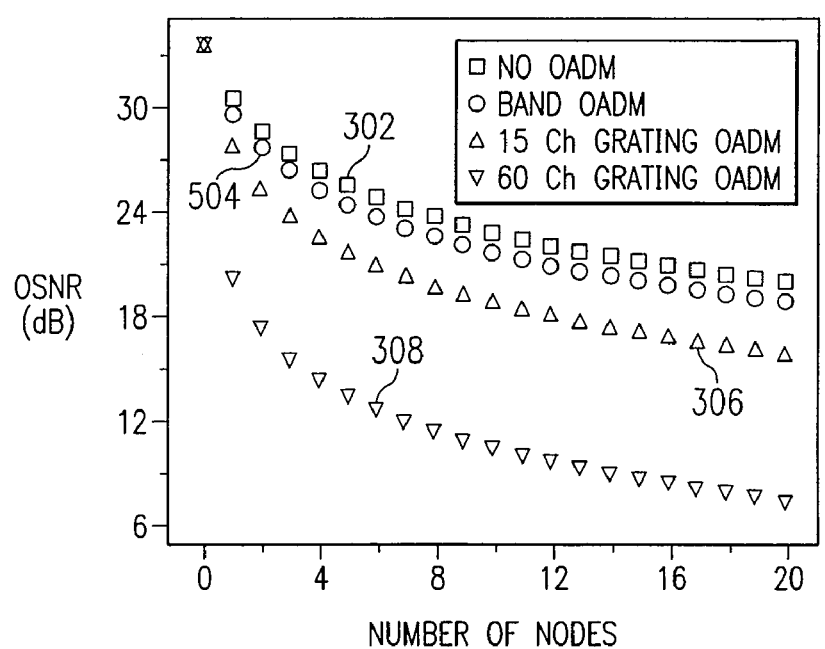
FIG. 5 depicts the resulting optical signal-to-noise ratio obtainable when an optical communication system implements band OADMs with guard-channels spaced between information bearing bands.

FIG. 5 depicts the resulting optical signal-to-noise ratio obtainable when the system discussed with respect to FIG. 3 implements band OADMs with guard-channels spaced between information bearing bands. In this example, line 504 represents the degradation of the optical signal-to-noise ratio of a system implementing a plurality of nodes each comprising a band OADM. As shown here, the use of band OADMs enables the system to include at least twenty OADMs, each capable of dropping the same bands of wavelength signals, while maintaining an 18 decibel optical signal-to-noise ratio.

Figure 6:
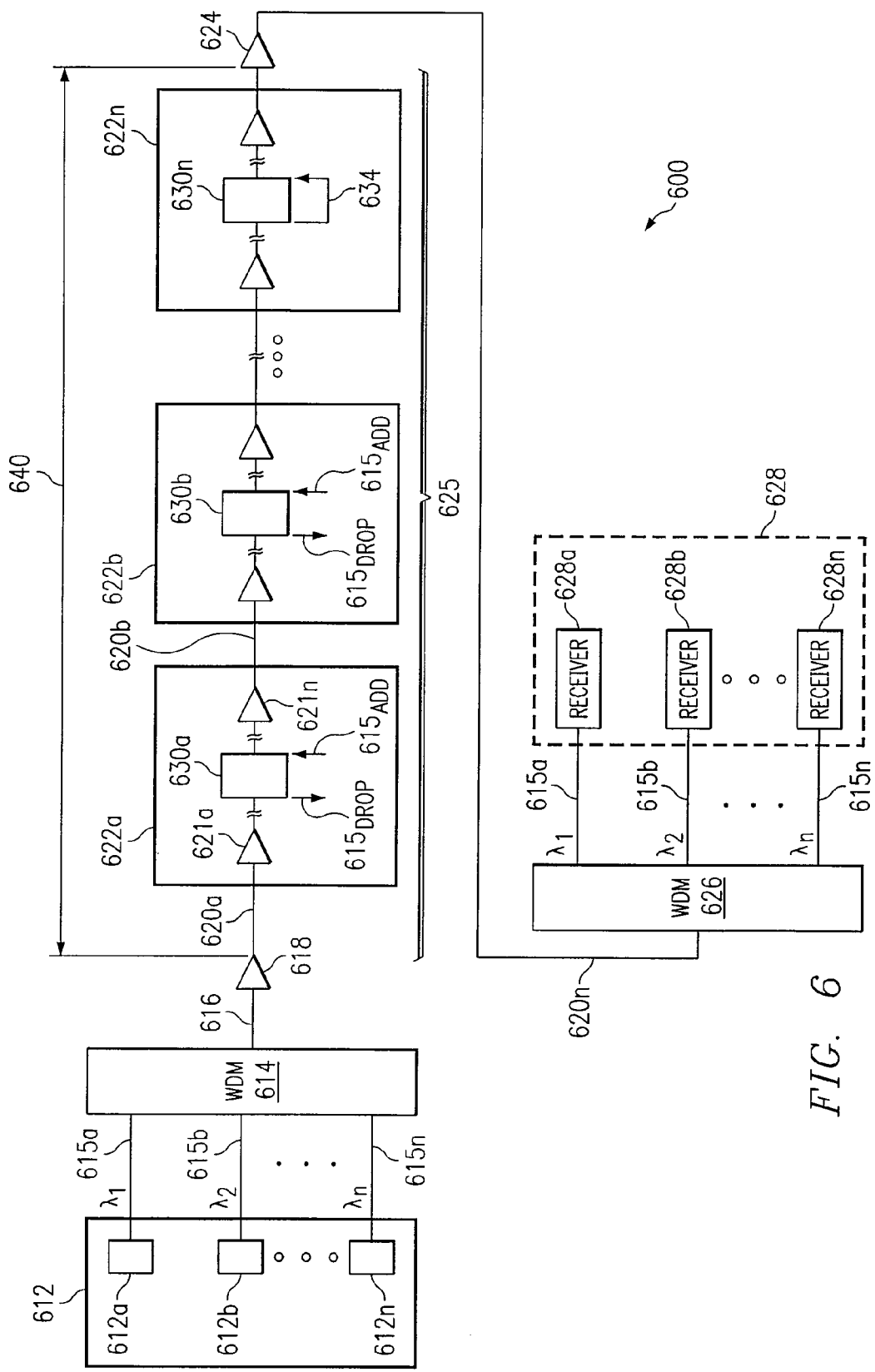
FIG. 6 is a block diagram showing an exemplary optical communication system implementing at least one band optical add/drop multiplexer.

FIG. 6 is a block diagram showing at least a portion of an exemplary optical communication system 600, which can incorporate a plurality of band OADMs 630a-630n. System 600 is intended to provide one example of numerous possible system configurations that can benefit from the use of a band OADM. OADMs described herein can be used in systems, like system 600, and can also be applied to many other system configurations.

In some embodiments, system 600 may comprise the entire optical communication system from beginning to end. In other embodiments, system 600 may comprise a portion of a larger optical communication system. In those embodiments, elements shown as containing transmitters and/or receivers could comprise optical regenerators residing within a larger multiple link communication system.

In this example, system 600 includes a transmitter assembly 612 operable to generate a plurality of optical signals (or channels) 615a-615n, each comprising a center wavelength of light. In some embodiments, each optical signal 615a-615n can comprise a center wavelength that is substantially different from the center wavelengths of other signals 615. As used throughout this document, the term "center wavelength" refers to a time averaged mean of the spectral distribution of an optical signal. The spectrum surrounding the center wavelength need not be symmetric about the center wavelength. Moreover, there is no requirement that the center wavelength represent a carrier wavelength.

All or a portion of transmitter assembly 612 could reside, for example, within a transponder capable of transmitting and receiving information. In one embodiment, transmitter assembly 612 comprises a plurality of independent pairs of optical sources and associated modulators. Alternatively, transmitter assembly 612 could comprise one or more optical sources capable of generating a plurality of optical signals and shared by a plurality of modulators. For example, transmitter assembly 612 could comprise a continuum source transmitter including a mode locked source operable to generate a series of optical pulses and a continuum generator operable to receive a train of pulses from the mode locked source and to spectrally broaden the pulses to form an approximate spectral continuum of optical signals. A signal splitter receives the continuum and separates the continuum into individual signals each having a center wavelength. In some embodiments, transmitter assembly 612 can also include a pulse rate multiplexer, such as a time division multiplexer, operable to multiplex pulses received from the mode locked source or the modulator to increase the bit rate of the system.

Transmitters 612 in system 600 comprise devices capable of converting an electrical signal into an optical wavelength. Transmitters 612 can receive electrical signals generated, for example, by source devices initiating communications. In other examples, transmitters 612 could receive electrical signals from receivers associated with transmitters 612. In that case, transmitters 612 and their associated receivers could serve as optical regenerators residing within a multiple link communication system.

In the illustrated embodiment, system 600 also includes a combiner 614 operable to receive a plurality of optical signals 615a-615n and to combine those signals into a multiple wavelength signal 616. As one particular example, combiner 614 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 600 communicates multiple wavelength optical signal 616 over an optical communication medium 620. Although communication medium 620 is shown as a point-to-point connection, communication medium 620 could assume any network configuration. For example, communication medium 620 could comprise all or a portion of a ring, mesh, star, or any other desired network configuration.

Communication medium 620 can comprise a plurality of spans 620a-620n of fiber, each coupled to or comprising an optical amplifier. In some embodiments all or a portion of a span can serve as a distributed amplification stage. Fiber spans 620a-620n could comprise standard single mode fiber (SMF), dispersion-shifted fiber (DSF), non-zero dispersion-shifted fiber (NZDSF), or another fiber type or combination of fiber types.

Two or more spans of communication medium 620 can collectively form an optical link. In the illustrated example, communication medium 620 includes a single optical link 625 comprising numerous spans 620a-620n. System 600 could include any number of additional links coupled to link 625. For example, optical link 625 could comprise one optical link of a multiple link system, where each link is coupled to other links through optical regenerators.

In the illustrated embodiment, system 600 comprises an optical system that communicates signal 616 over optical link 625 a link distance 640. In various embodiments, link distance 640 can comprise a distance up to 300 kilometers, 600 kilometers, or 900 kilometers or more.

In this example, system 600 includes a booster amplifier 618 operable to receive and amplify wavelengths of signal 616 in preparation for transmission over a communication medium 620. Optical communication system 600 can also include a preamplifier 624 operable to amplify signal 616 received from a final fiber span 620n. Although optical link 625 is shown to include one or more booster amplifiers 618 and preamplifiers 624, one or more of these amplifier types could be eliminated in other embodiments.

Where communication system 600 includes one or more fiber spans 620a-620n, system 600 can also include one or more in-line amplifiers 622a-622n. In-line amplifiers 622 couple to one or more spans 620a-620n and operate to amplify signal 616 as it traverses communication medium 620. In this particular embodiment, in-line amplifiers 622 comprise multiple stage amplifiers each including a plurality of amplification stages 621a-621n.

Throughout this document, the term "amplifier" denotes a device or combination of devices operable to at least partially compensate for at least some of the losses incurred by signals while traversing all or a portion of optical link 625. Likewise, the term "amplification" refers to offsetting at least a portion of losses that would otherwise be incurred.

An amplifier may, or may not impart a net gain to a signal being amplified. Moreover, the term "gain" as used throughout this document, does not—unless explicitly specified—require a net gain. In other words, it is not necessary that a signal experiencing "gain" or "amplification" in an amplifier stage experiences enough gain to overcome all losses in the amplifier stage. As a specific example, distributed Raman amplifier stages typically do not experience a net gain because of the high losses in the transmission fiber that serves as a gain medium. Nevertheless, these devices are considered "amplifiers" because they offset at least a portion of the losses experienced in the transmission fiber.

Amplifiers 618, 622, and 624 could each comprise, for example, a discrete Raman amplifier, a distributed Raman amplifier, a rare earth doped amplifier such as an erbium doped or thulium doped amplifier, a semiconductor amplifier or a combination of these or other amplifier types.

In some embodiments, multiple wavelength signal 616 carries wavelengths ranging across different communications bands (e.g., the short band (S-band), the conventional band (C-band), and/or the long band (L-band)). In those cases, amplifiers 618, 622, and 624 could each comprise a wide band amplifier, each operable to amplify all signal wavelengths received. Alternatively, one or more of those amplifiers could comprise a parallel combination of amplifier assemblies, each operable to amplify a portion of the wavelengths of multiple wavelength signal 616. In that case, system 600 could incorporate signal dividers and signal combiners surrounding the parallel combinations of amplifier assemblies to facilitate separation of the wavelength groups prior to amplification and recombination of the wavelengths following amplification.

System 600 also includes a separator 626 operable to separate individual optical signals 615a-615n from multiple wavelength signal 616. Separator 626 can communicate individual signal wavelengths or ranges of wavelengths to a bank of receivers 628 and/or other optical communication paths. Separator 626 may comprise, for example, a wavelength division demultiplexer (WDM).

System 600 comprises a plurality of optical add/drop multiplexers (OADMs), each operable to remove one or more wavelength signals $615_{DROP}$ from multiple wavelength signal 616 and to add one or more wavelength signals $615_{ADD}$ to multiple wavelength signal 616. At least one OADM 630 comprises a band optical add/drop multiplexer 630. Band OADMs 630 may comprise any hardware, software, firmware, or combination thereof operable to approximately simultaneously drop one or more bands of signals $615_{DROP}$ from multiple wavelength signal 616. Band OADM 630 is also operable to approximately simultaneously add one or more bands of signals $615_{ADD}$ to multiple wavelength signal 616. In various embodiments, each band OADM 630 may comprise a static OADM capable of adding/dropping the same bands of wavelengths. In other embodiments, each band OADM 630 may comprise a tunable OADM capable of adding/dropping different bands of wavelengths. In one particular embodiment, each band OADM 630 could comprise, for example, a multi-cavity thin film filter.

In this example, OADMs 630 reside mid-stage within in-line amplifiers 622*a*-622*n*. Although OADMs 630 can reside anywhere in system 600, locating an OADM mid-stage in an in-line amplifier provides an advantage of avoiding noise and non-linearity penalties. For example, if an OADM was placed prior to a first amplification stage 621*a*, losses would be introduced prior to amplification. In that embodiment, any noise introduced by the OADM would be amplified, degrading the optical signal-to-noise ratio. If an OADM was placed after the final amplification stage 621*n*, non-linearity penalties could result. The illustrated embodiment advantageously locates the OADM after the first stage 621*a* of the multiple stage in-line amplifier, and before the last stage 621*n* of the amplifier. This helps to avoid degrading the optical signal-to-noise ratio and reduces non-linearity penalties.

Not all OADMs 630 in system 600 need be operational at any given time. Moreover, not all OADMs need to add and/or drop signals at their full capacities at all times. For example, some OADMs 630 can be installed in system 600, but may be incapable of providing full, or any add/drop functionality. This may be advantageous, for example, where traffic demands do not, at the time of installation, warrant add/drop functionality at a given network location, but where it is envisioned that add/drop functionality may someday be desired at that location.

The embodiment shown in FIG. 6 provides the ability to bypass some or all add/drop functionality by implementing a removable short circuit 634 coupled between a drop port and an add port of OADM 630. In particular, OADM 630*n* shows this configuration. If and when it is determined that add/drop functionality is desired at OADM 630*n*, short circuit 634 can be removed, for example, by cutting circuit 634 to open access to the drop and add ports of OADM 630.

In some embodiments, a narrower band OADM can be coupled between the add and drop ports using circuit 634. In that case, wider band OADM 630 can direct a first group of wavelengths to path 634, and the narrower band OADM can provide add/drop functionality to a portion of the wavelengths diverted from link 620. For example, wider OADM 630 could divert, say, 60 wavelength signals from multiple wavelength signal 616. The narrower OADM could provide add/drop functionality to, say, 16 of the 60 diverted signals, while allowing the remaining 634 signals to pass directly to the add port of wider OADM 630.

Band OADMs 630 that are not short-circuited are each capable of dropping and/or adding one or more bands of wavelengths diverted from communication link 620. As discussed above, utilizing band OADMs to process information bearing bands, each separated by one or more sacrificial guard-channels reduces spectral distortion experienced by information carrying bands, particularly pass-through bands. Some embodiments of OADMs 630 are capable of each dropping a plurality of bands of signal wavelengths. Other systems dropping bands of wavelengths have conventionally added/dropped only one band of signals at each node. Some embodiments described herein can approximately simultaneously drop a plurality of bands at one node. This can provide advantages of further reducing spectral distortion among added/dropped wavelength signals.

Figure 7:
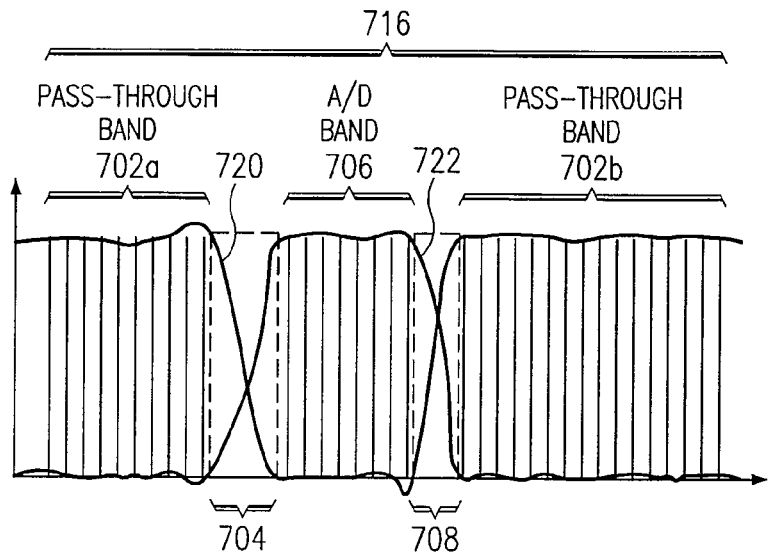
FIG. 7 is a graph showing one possible spectral response of a band OADM.

FIG. 7 is a graph showing one possible spectral response of a band OADM 630. In this example, band OADM 630 operates to drop band 706 from multiple wavelength signal 716, while allowing pass-through bands 702*a* and 702*b* to pass through. Lines 720 and 722 represent the filter function of band OADM 630. This example further shows the use of guard-channels 704 and 708 between pass-through bands 702 and add/drop band 706. Guard-channels are used in band OADM 630 because it can be difficult to design an OADM with a filter function that does not adversely affect at least one wavelength signal adjacent to the add/drop band 706.

The example shown in FIG. 7 illustrates how the use of guard-channels 704 and 708 between pass-through bands 702 and add/drop bands 706 can reduce signal degradation problems in wavelength signals adjacent to the add/drop band. In this example, guard-channels 704 and 708 will be affected by the filter function associated with the band OADM and will protect the filter function from adversely impacting pass-through band 702. Signals in the pass-through bands and the add/drop bands will, therefore, experience low insertion losses and little or no spectral distortion.

Figure 8A:
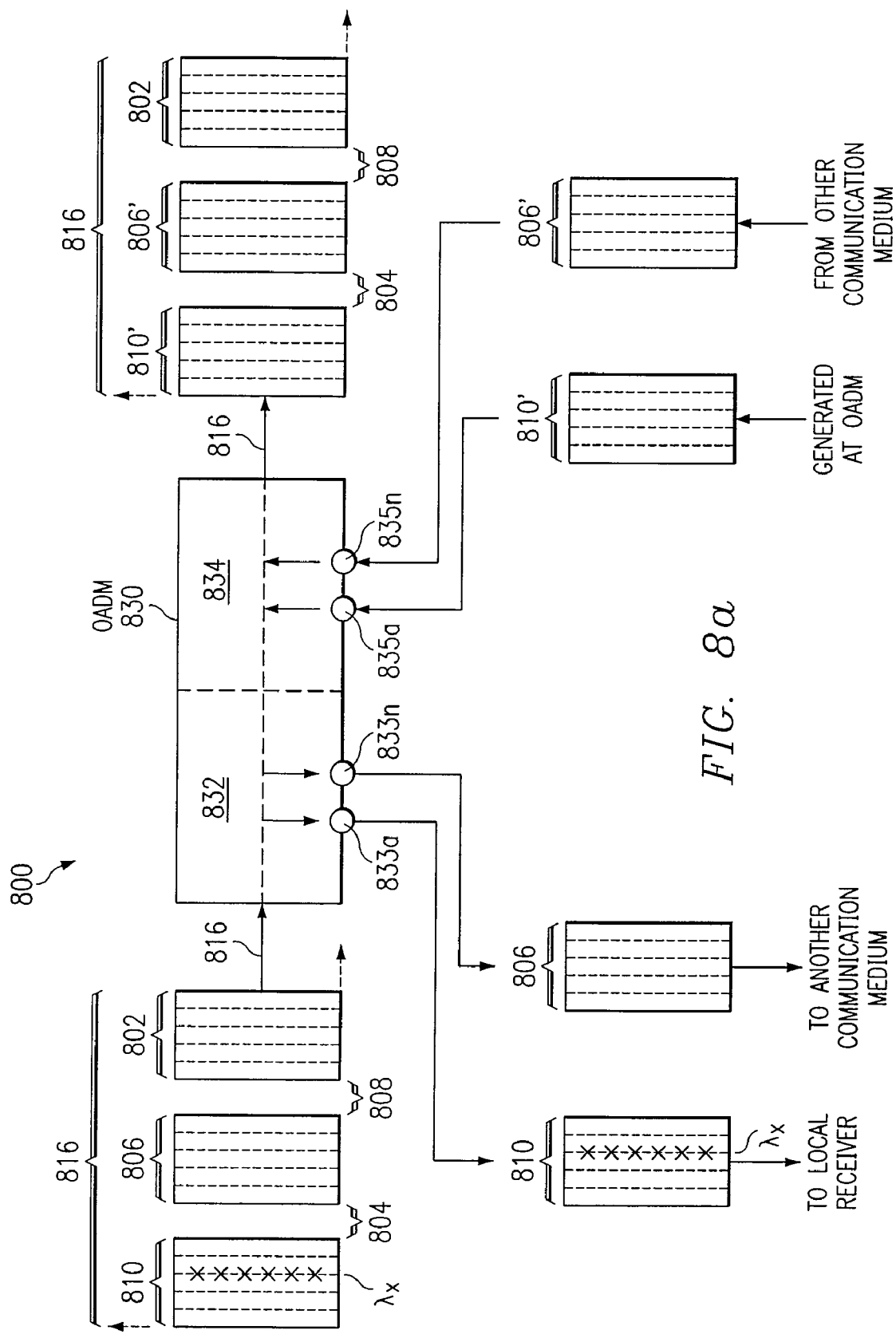
FIG. 8A is a graph showing approximately simultaneous adding and dropping of multiple bands at a single node.

FIG. 8A is a graph showing approximately simultaneous dropping of multiple bands at a single node. In this example, band OADM 830 includes one or more drop ports 832 operable to receive multiple wavelength signal 816 and to direct the wavelengths in drop bands 806 and 810 toward one or more drop ports 833*a*-833*n*. Although this example drops two bands, any number of bands may be added/dropped without departing from the scope of the present invention. OADM 830 passes pass-through band 802 and guard-channels 804 and 808 on for further transmission.

Some added/dropped bands 810 may be separated into individual wavelengths and passed to a receiver local to drop ports 833. Others of added/dropped bands 806 may be directed for communication to other communication media.

OADM 830 also includes one or more add ports 835*a*-835*n*. Add ports 835 may receive bands of wavelength signals from transmitters residing locally to add ports 835, or may receive bands of signals from other communication media. Add ports 835 direct one or more bands of wavelength signals 810' and 806' for inclusion with pass-through traffic 816 to be communicated on communication medium 620.

Figure 8B:
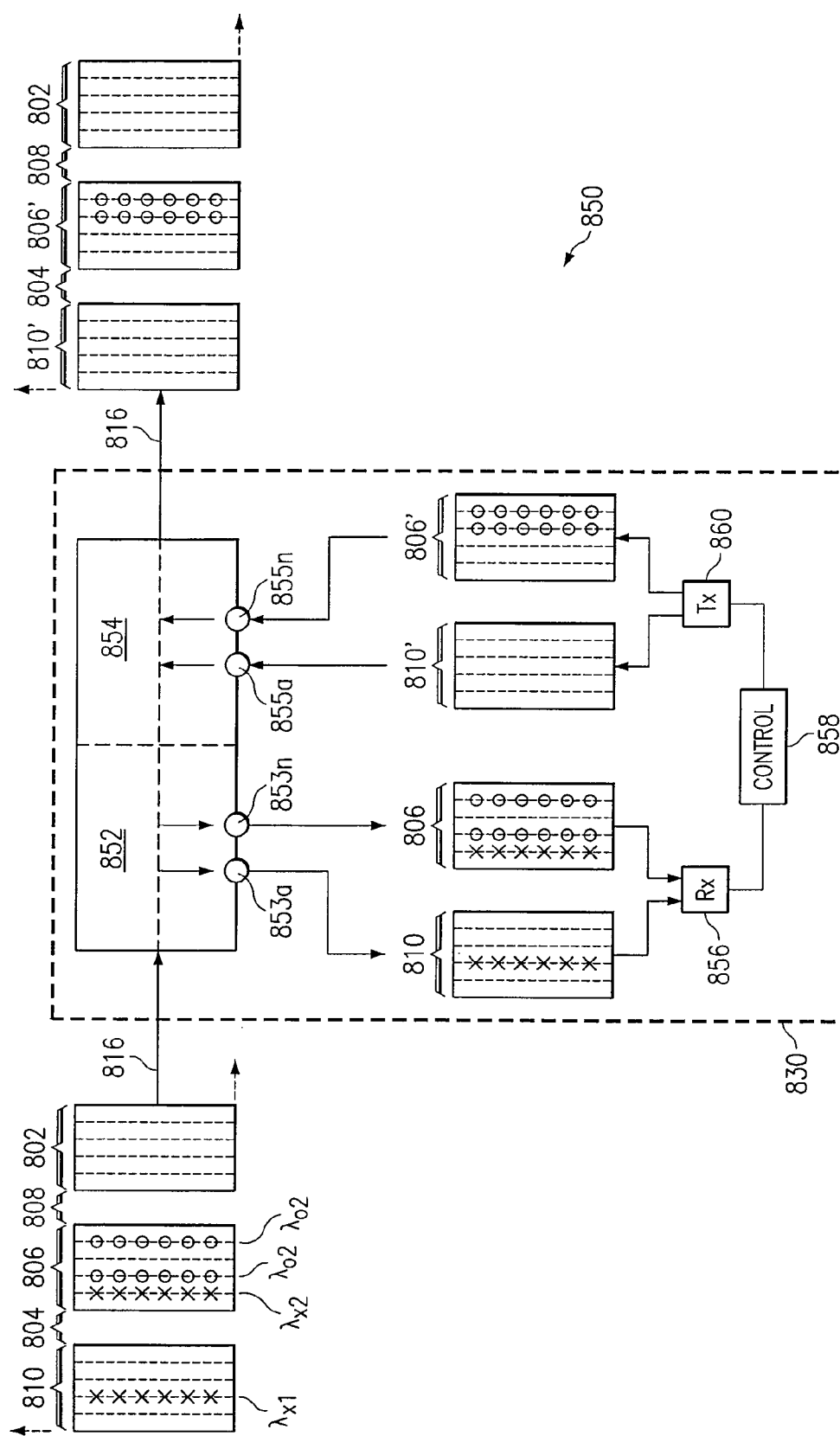
FIG. 8B is a graph showing another example of approximately simultaneous adding and dropping of multiple bands in a single node.

FIG. 8B is a graph showing approximately simultaneous dropping of multiple bands and recirculating some of the wavelength channels from a dropped band for recombination with the pass-through channels. In this example, band OADM 830 includes one or more drop ports 853*a*-853*n* operable to receive multiple wavelength signal 816 and to direct the wavelengths in drop bands 806 and 810 from communication link 820. Although this example comprises two drop bands, any number of bands may be added/dropped without departing from the scope of the present invention. OADM 830 passes pass-through band 802 and guard-channels 804 and 808 on for further transmission.

Band OADM 830 further includes at least one receiver 856 operable to receive drop bands 806 and 810 from drop element 852. Receiver 856 separates bands 806 and 810 into their individual wavelength signals and converts the individual wavelength signals into an electrical format. Band OADM also includes a control element 858 operable to determine whether the converted signals contain information designated for communication to another node within the system and to route the signals accordingly. Band OADM further includes a transmitter 860 operable to receive the converted signals designated for communication to another node. Transmitter 860 also converts those signals into new optical wavelength signals and combines the new optical wavelength signals with other wavelength signals to form add bands 806' and 810'.

In the illustrated embodiment, drop bands 806 and 810 each comprise a plurality of individual wavelengths with at least one wavelength $\lambda_x$ carrying information designated for this node. Drop band 806 further includes at least one wavelength $\lambda_o$ carrying information designated for communication to another node within the system. Receiver 856 separates drop bands 806 and 810 into individual wavelength signals and converts each signal to an electrical format. Control element 858 routes the electrical signals containing information designated for communication to another node to transmitter 860 for reformation into new individual optical wavelength signals $\lambda_o$. The new individual optical wavelength signals $\lambda_o$ are combined with other individual wavelength signals to form add bands 806' and 810'. Converting the added/dropped optical signal into an electrical format and reforming the optical signal from the electrical format is advantageous in reducing spectral distortion associated with recirculated optical signals.

In an alternative embodiment, drop bands 806 and 810 each comprise a plurality of individual wavelengths with at least one wavelength $\lambda_x$ carrying information designated for this node. Drop band 806 further includes at least one wavelength $\lambda_o$ carrying information designated for communication to another node within the system. Receiver 856 separates bands 806 and 810 into their individual wavelength signals. Control element 858 routes the separated individual signals containing information designated for communication to another node to transmitter 860. Transmitter 860 receives the separated individual signals designated for communication to another node and combines these signals with other signals to form add bands 806' and 810'. In this example, the separated individual wavelengths containing information designated for communication to another node remain as optical signals throughout the recirculation process.

OADM 830 also includes one or more add ports 855a-855n. Add ports 855 may receive bands of wavelength signals from transmitters residing locally, or may receive bands of signals from other communication media. Add ports 855 direct one or more bands of wavelength signals 810' and 806' for inclusion with pass-through traffic 816 to be communicated on communication medium 620.

To the extent that any conventional systems communicate information in bands of wavelengths, those systems designate each wavelength to one particular band assigned to carry traffic between two particular nodes. Once designated, the wavelength can only be used for carrying traffic between the nodes associated with that band. In those systems, no one particular wavelength is used to carry traffic between multiple sets of nodes. At least one embodiment herein recognizes that there are more efficient ways to allocate bandwidth.

In addition, to the extent that these system implement any guard-channels, those channels are initially allocated at specific wavelengths between statically allocated wavelength bands. No wavelength signal designated as a guard-channel is ever used to carry information, and no signal designated for carrying information is ever used as a guard-channel. This, again, is an inefficient use of bandwidth.

In some embodiments, one or more band OADMs 630 capable of adding/and or dropping a plurality of bands of wavelength signals can facilitate redesignation of particular wavelengths between guard-channel status and information bearing status. In other words, some embodiments of system 600 facilitate designation of a particular wavelength signal $\lambda_x$ as a sacrificial guard-channel while traversing some areas of system 600, and redesignation of that same wavelength signal $\lambda_x$ as an information bearing channel in other regions of system 600. In a similar manner, these embodiments allow the same wavelength signal to carry information as part of a first band communicated between a first pair of nodes, and to carry information as part of a second band between two other nodes. Where the same wavelength is communicated as part of two separate bands, those bands will overlap in some, but not all wavelengths.

Redesignating wavelengths between bands and/or between information bearing status and guard-channel status can facilitate more efficient use of bandwidth, by allowing reuse of the same wavelengths to serve multiple functions at different locations in the network. At the same time, this technique reduces degradation of information bearing channels by dropping those channels in bands of signals, separated by sacrificial guard-channels.

Figure 9:
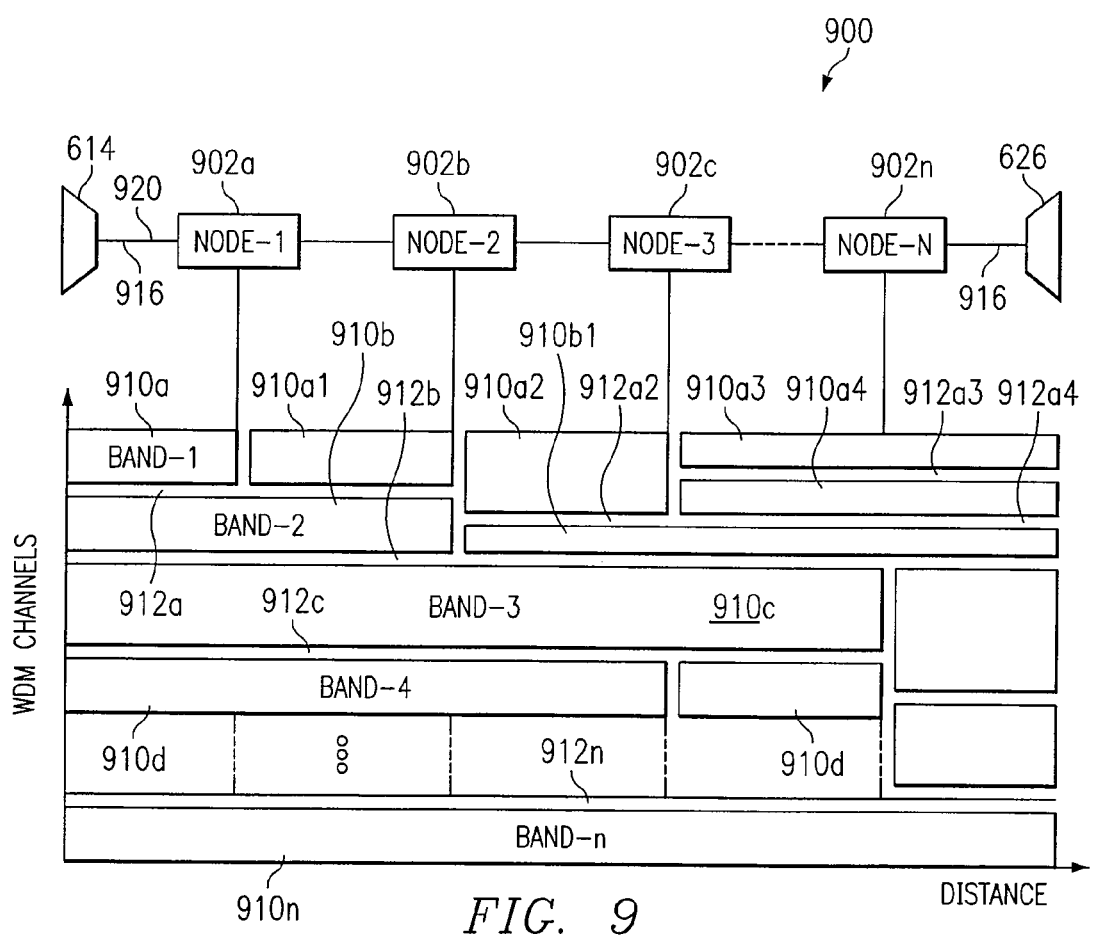
FIG. 9 is a graph showing one possible system response in an optical communication system implementing bandwidth redesignation.

FIG. 9 is a graph showing one possible system response in a system 900 implementing bandwidth redesignation. In this example, communication system 900 includes a plurality of nodes 902a-902n each operable to receive and communicate a multiple wavelength signal 916. Each node 902 includes a band OADM coupled between spans of communications medium 920, and operable to approximately simultaneously drop and/or add one or more bands of wavelengths from signal 916. Multiple wavelength signal 916 includes a plurality of bands 910a-910n separated by a plurality of guard-channels 912a-912n. In this example, each pair of bands 910 can be separated by one or more guard-channels.

FIG. 9 shows that bands of wavelengths may be redesignated at various nodes 902 within system 900 in various combinations and subcombinations. Although FIG. 9 shows a point-to-point portion of a network, band redesignation can be implemented in a ring, mesh, star, or any other desired network structure.

As one particular example of wavelength redesignation, wavelength signals forming multiple smaller bands received by a node can be redesignated to one or more larger bands of wavelengths for transmission to another node. Using this technique, some or all of the guard-channels between the smaller bands can be redesignated as information bearing channels and included in the larger band or bands exiting the nodes. Likewise, some channels relied on to communicate information in the smaller bands can be redesignated as guard-channels for the larger resulting band.

As a particular example with respect to FIG. 9, node 902b receives and drops information bearing bands 910a1 and 910b, which are separated by guard-channels 912a. After dropping bands 910a1 and 910b and guard-channels 912a, node 902b redesignates wavelengths from the dropped bands to form larger information bearing band 910a2 and smaller information bearing band 910b1. Larger information bearing band 910a1 facilitates communication between node 902b and 902c, while smaller information bearing band facilitates communication between node 902b and another node 902 further down communication link 920. Due to, for example, a high volume of traffic between node 902b and 902c, it may be desirable to allocate a larger bandwidth of signals to that communication path.

In an optical communication system that comprises an abundance of optical channels, redesignating wavelengths provides the advantage of enabling greater bandwidth allocation flexibility throughout the system. For example, in a system with an abundance of channels, the system can afford to intentionally sacrifice various channels as guard-band channels to ensure the integrity of other information bearing channels. Systems with many channels can provide the flexibility of allowing sacrificial channels and redesignation of sacrificial channels, while maintaining sufficient channels for information carrying duty.

Alternatively, where an optical communication system comprises relatively few optical channels, redesignating wavelengths previously used for communication between one pair of nodes facilitates a higher efficiency use of available bandwidth. Moreover, in this example, node 902*b* continues to reduce spectral distortion by allocating at least one wavelength between bands 910*a*2 and 910*b*1 as a guard-channel 912*a*2. Notice that at least some of the same wavelengths used as guard-channels between nodes 902*a* and 902*b* are used as information bearing channels between nodes 902*b* and 902*c*. Likewise, at least some of the same wavelengths used for information bearing channels between nodes 902*a* and 902*b* are used as sacrificial guard-channels between nodes 902*b* and 902*c*.

As shown in this illustration, transmission band 910*a*2 coming from node 902*b* comprises the bandwidth originally associated with bands 910*a*1 and 912*a*1 and also includes at least one wavelength that was originally part of transmission band 910*b*. Further, a new guard-channels 912*a*2 formed between bands 910*a*2 and 910*b*1 comprise at least one wavelength that was originally part of transmission band 910*b*.

This example assumes that information received by node 902*b*, which is carried in bands 910*a*1 and 910*b* is destined for network elements local to node 902*b*, or destined to be routed to another communication link from node 902*b*. If it is desired to have one or more individual wavelength signals from bands 910*a*1 or 910*b* to continue on communication link 920 within new bands 910*a*2 or 910*b*1, there are several options available. One option is to separate the desired signals from their associated input bands, and route those signals to an add port of node 902*b* for inclusion in the new band. This approach, however, can result in different levels of spectral distortion being introduced into the rerouted wavelength signal compared to the other wavelength signals in the outgoing band.

Another approach would be to send the desired pass through wavelength signals to a receiver for conversion to an electrical format, followed by reformation of a new optical signal based on the converted electrical signal. The reformed optical wavelength signal could then be routed to an add port of node 902*b* along with other signals for inclusion in the new band. Converting the dropped optical wavelength signal into an electrical signal and back into an optical signal provides the advantage of reducing the asymmetry penalty and chromatic dispersion associated with OADMs.

As another particular example of wavelength redesignation, wavelength signals forming one or more larger bands of wavelengths received by a node can be redesignated to multiple smaller bands for transmission to another node or nodes. Using this technique, some or all of the guard-channels between the larger bands can be redesignated as information bearing channels and included in the multiple smaller bands exiting the node. Likewise, some channels relied on to communicate information in the one or more large bands can be redesignated as guard-channels separating the multiple smaller resulting bands.

As a particular example with respect to FIG. 9, node 902*c* receives and drops information bearing band 910*a*2. After dropping band 910*a*2, node 902*c* redesignates wavelengths from the dropped band to form multiple smaller information bearing bands 910*a*3 and 910*a*4. Multiple smaller information bearing bands 910*a*3 and 910*a*4 facilitates communication between node 902*c* and one or more nodes 902 further down communication link 920. Due to, for example, a lower volume of traffic between node 902*c* and another node 902, it may be desirable to allocate a smaller bandwidth of signals to that communication path.

In an optical communication system that comprises an abundance of optical channels, redesignating wavelengths provides the advantage of enabling bandwidth allocation flexibility throughout the system. Alternatively, where an optical communication system comprises relatively few optical channels, redesignating wavelengths previously used for communication between one pair of nodes facilitates a more efficient use of available bandwidth. Moreover, in this example, node 902*c* continues to reduce spectral distortion by allocating at least one wavelength between bands 910*a*3 and 910*a*4 as a guard-channel 912*a*3. Notice that at least some of the same wavelengths used as information bearing channels between nodes 902*b* and 902*c* are used as guard-channels between nodes 902*c* and another node 902.

As shown in this illustration, transmission band 910*a*3 coming from node 902*c* comprises a portion of the bandwidth originally associated with band 910*a*2, while transmission band 910*a*4 comprises another portion of the bandwidth originally associated with band 910*a*2. Further, a new guard-channel 912*a*3 formed between bands 910*a*3 and 910*a*4 comprises at least one wavelength that was originally part of transmission band 910*a*2.

This example assumes that information received by node 902*c*, which is carried in band 910*a*2 is destined for network elements local to node 902*c*, or destined to be routed to another communication link from node 902*c*. If it is desired to have one or more individual wavelength signals from band 910*a*2 continue on communication link 920 within new bands 910*a*3 or 910*a*4, there are several options available. One option is to separate the desired signals from their associated input bands, and route those signals to an add port of node 902*c* for inclusion in the new band. This approach, however, can result in different levels of spectral distortion being introduced into the rerouted wavelength signal compared to the other wavelength signals in the outgoing band.

Another approach would be to send the desired pass through wavelength signals to a receiver for conversion to an electrical format, followed by reformation of a new optical signal based on the converted electrical signal. The reformed optical wavelength signal could then be routed to an add port of node 902*c* along with other signals for inclusion in the new band. Converting the dropped optical wavelength signal into an electrical signal and back into an optical signal provides the advantage of reducing the asymmetry penalty and chromatic dispersion associated with OADMs.

Implementing band redesignation in an optical communication system provides the advantage of allowing flexible bandwidth allocation and redesignation throughout the system. That is, band redesignation allows reuse of the same wavelengths to provide node-to-node communication between multiple sets of nodes. In other words, a designated band of particular wavelengths can carry information between two particular nodes. Upon receipt by a particular node, at least one of these particular wavelengths can be redesignated within a different band of wavelengths and designated to carry information between another pair of nodes. One advantage of band redesignation is that it enables the system to accommodate increased traffic between two nodes without requiring the designation of a relatively large bandwidth for communication between other nodes within the system.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A multiple span optical communication system comprising:
    at least one optical add/drop multiplexing (OADM) node operable to receive at least a first input band comprising a first plurality of signal wavelengths, at least a second input band comprising a second plurality of signal wavelengths, and at least one signal wavelength that is designated as a first guard-channel, wherein the first guard-channel is substantially free from being an information bearing channel, wherein each of the first plurality of signal wavelengths of the first input band is different than each of the second plurality of signal wavelengths of the second input band, wherein each of the first plurality of wavelengths and each of the second plurality of wavelengths received by the OADM is designated as an information bearing channel, and wherein the first guard-channel received by the OADM separates the first input band from the second input band, the at least one OADM further operable to communicate at least one output band and at least another signal wavelength that is designated as a second guard-channel that separates the at least one output band from other output bands, wherein the second guard-channel is substantially free from being an information bearing channel;
    wherein at least one signal wavelength of the second plurality of signal wavelengths received by the OADM is designated as the second guard-channel communicated from the OADM, and wherein the at least one signal wavelength of the first guard-channel received by the OADM is designated as an information bearing channel in the at least one output band communicated from the OADM.

2. The multiple span optical communication system of claim 1, wherein the second input band resides spectrally adjacent to the at least one signal wavelength that is designated as the first guard-channel, the first guard-channel operable to assist in protecting at least the second input band during communication between a first node and the at least one OADM node; and
    wherein the at least one output band comprises at least some of the second plurality of wavelength signals of the second input band and the at least one signal wavelength of the at least one guard-channel redesignated to carry information between the at least one OADM node and a second node.

3. The multiple span optical communication system of claim 1, wherein:
    the second input band resides spectrally adjacent to the at least one signal wavelength that is designated as the first guard-channel, the first guard-channel operable to assist in protecting at least the second input band during communication between a first node and the at least one OADM node;
    wherein the at least one signal wavelength that is designated as the first guard-channel resides spectrally adjacent to the first input band used to carry information between the first node and the at least one OADM node; and
    wherein the at least one output signal band comprises at least some of the second plurality of wavelength signals of the second input band, the at least one signal wavelength of the at least one signal wavelength that is designated as the first guard-channel, and at least one signal wavelength from the first plurality of signal wavelengths of the first input band, designated to carry information between the at least one OADM node and a second node.

4. The multiple span optical communication system of claim 1, further comprising:
    a plurality of low distortion OADM nodes each coupled between spans of a multiple span communications link and operable to receive a multiple wavelength signal comprising a plurality of bands of wavelength signals each separated by at least one guard-channel;
    wherein each of the plurality of low distortion OADM nodes adds/drops one or more bands of wavelengths to/from the multiple wavelength signal.

5. The multiple span optical communication system of claim 4, wherein the plurality of low distortion OADM nodes comprises a tunable OADM operable to selectively add/drop one or more bands.

6. The multiple span optical communication system of claim 4, wherein each band is separated from an adjacent band by at least two (2) guard-channels.

7. The multiple span optical communication system of claim 4, wherein each low distortion OADM introduces to a pass-through wavelength signal spectrally adjacent to a guard-channel that is adjacent to the first input band an asymmetry penalty of no more than 1.0 decibels.

8. The multiple span optical communication system of claim 4, wherein each low distortion OADM introduces to a pass-through wavelength signal spectrally adjacent to a guard-channel that is adjacent to the first input band an asymmetry penalty of no more than 0.3 decibels.

9. The multiple span optical communication system of claim 4, wherein the plurality of low distortion OADMs introduces an asymmetry penalty of no more than two (2) decibels after exiting the last of the plurality of low distortion OADMs.

10. The multiple span optical communication system of claim 4, wherein the plurality of low distortion OADMs collectively degrade a Q-factor associated with a pass-through wavelength signal spectrally adjacent to a guard-channel that is adjacent to the first input band by no more than 3.0 decibels.

11. The multiple span optical communication system of claim 4, wherein the plurality of low distortion OADMs collectively degrade a Q-factor associated with a pass-through wavelength signal spectrally adjacent to a guard-channel that is adjacent to the first input band by no more than 0.5 decibels.

12. A multiple span optical communication system comprising:
    at least one optical add/drop multiplexing (OADM) node operable to receive at least a first input band comprising a first plurality of signal wavelengths, a second input band comprising a second plurality of wavelengths, and at least one signal wavelength that is designated as a first guard-channel, wherein the first guard-channel is substantially free from being an information bearing channel, wherein each of the first plurality of signal wavelengths of the first input band is different than each of the second plurality of signal wavelengths of the second input band, wherein each of the first plurality of wavelengths and each of the second plurality of wavelengths received by the OADM is designated as an information bearing channel, and wherein the first guard-channel received by the OADM separates the first input band from the second input band, the at least one OADM further operable to communicate at least one output band and at least another signal wavelength that is designated as a second guard-channel that separates the at least one output band from other output bands, wherein the second guard-channel is substantially free from being an information bearing channel; wherein the at least one output band communicated from the OADM comprises a third plurality of signal wavelengths that includes at least some of the first plurality of signal wavelengths and the at least one wavelength of the first guard-channel received by the OADM, wherein each of the third plurality of signal wavelengths of the output band is designated as an information bearing channel.

13. The multiple span optical communication system of claim 12, wherein the at least one output band comprises:
   a first output band comprising the second plurality of signal wavelengths, the second plurality of signal wavelengths comprising at least a first portion of the first plurality of signal wavelengths associated with the at least one input band; and
   a second output band comprising a third plurality of signal wavelengths, the third plurality of signal wavelengths comprising at least a second portion of the first plurality of signal wavelengths associated with the at least one input band.

14. The multiple span optical communication system of claim 12, wherein:
   the first input band is associated with communications between a first node and the at least one OADM node;
   the first output band is associated with communications between the at least one OADM node and a second node; and
   the second output band is associated with communications between the at least one OADM node and a third node.

15. The multiple span optical communication system of claim 12, wherein:
   the first input band resides spectrally adjacent to the at least one signal wavelength that is designated as the first guard-channel, the first guard-channel operable to assist in protecting at least the first input signal band during communication between a first node and the at least one OADM node; and
   wherein the at least one output band comprises the at least one guard-channel redesignated to carry information between the at least one OADM node and the second node.

16. The multiple span optical communication system of claim 12, wherein the multiple span communications link comprises a length of at least 900 kilometers.

17. A method of communicating optical signals using a band optical add/drop multiplexer, comprising:
   receiving a multiple wavelength signal comprising at least a first input band comprising a first plurality of signal wavelengths, a second input band comprising a second plurality of signal wavelengths, and at least one signal wavelength that is designated as a first guard-channel, wherein the first guard-channel is substantially free from being an information bearing channel, wherein each of the first plurality of signal wavelengths of the first input band is different than each of the second plurality of signal wavelengths of the second input band, wherein each of the first plurality of wavelengths and each of the second plurality of wavelengths received by the OADM is designated as an information bearing channel, and wherein the first guard-channel received by the OADM separates the first input band from the second input band; and
   communicating at least one output band and at least another signal wavelength that is designated as a second guard-channel that separates the at least one output band from other output bands, wherein the second guard-channel is substantially free from being an information bearing channel;
   wherein at least one signal wavelength of the second plurality of signal wavelengths received by the OADM is designated as the second guard-channel communicated from the OADM, and wherein the at least one signal wavelength that is designated as the first guard-channel received by the OADM is designated as an information bearing channel in the at least one output band communicated from the OADM.

18. The method of communicating of claim 17, wherein:
   the second input band is associated with communications between a first node and at least one OADM node; and
   wherein the at least one output band is associated with communications between the at least one OADM node and a second node.

19. The method of communicating of claim 17, wherein:
   the second input band resides spectrally adjacent to the at least one signal wavelength that is designated as the first guard-channel, the first guard-channel operable to assist in protecting at least the second input band during communication between a first node and at least one OADM node; and
   wherein the at least one output band comprises at least some of the second plurality of wavelength signals of the second input band and the at least one signal wavelength that is designated as the first guard-channel redesignated to carry information between the at least one OADM node and a second node.

20. The method of communicating of claim 17, wherein:
   the second input band resides spectrally adjacent to the at least one signal wavelength that is designated as the first guard-channel, the first guard-channel operable to assist in protecting at least the second input band during communication between the first node and the at least one OADM node;
   wherein the first guard-channel resides spectrally adjacent to the first input band used to carry information between the first node and the at least one OADM node; and
   wherein the at least one output signal band comprises at least some of the second plurality of wavelength signals of the second input band, the at least one signal wavelength that is designated as the first guard-channel, and at least one signal wavelength from the first plurality of signal wavelengths of the first input band, redesignated to carry information between the at least one OADM node and a second node.

* * * * *